United States Patent [19]
Flynn

[11] Patent Number: 5,555,845
[45] Date of Patent: Sep. 17, 1996

[54] CONTAINER AND METHOD FOR TRANSPORTING LIVE CRUSTACEANS

[76] Inventor: Thomas S. Flynn, Suite 700, 5959 Spring Garden Road, Halifax, Nova Scotia, Canada, B3H 1Y5

[21] Appl. No.: 313,603

[22] Filed: Sep. 29, 1994

[51] Int. Cl.$^6$ .................................................. A01K 63/02
[52] U.S. Cl. ............................ 119/201; 119/214; 119/472
[58] Field of Search ....................................... 119/201, 202, 119/203, 209, 210, 214, 472, 473; 220/501, 507, 510, 552

[56] References Cited

U.S. PATENT DOCUMENTS

| | | | |
|---|---|---|---|
| 1,639,555 | 8/1927 | Clark | 119/214 |
| 2,412,325 | 12/1946 | Devine et al. | 206/508 |
| 3,656,650 | 4/1972 | Frater | 220/510 |
| 4,279,218 | 7/1981 | Brinkworth | 119/210 |
| 4,635,810 | 1/1987 | Tate | 220/510 |
| 5,218,923 | 6/1993 | La Rosa | 119/214 |
| 5,390,815 | 2/1995 | Spiegel | 220/552 |

FOREIGN PATENT DOCUMENTS

| | | | |
|---|---|---|---|
| 1182272 | 7/1989 | Japan | 119/214 |
| 2067520 | 7/1981 | United Kingdom | 220/552 |

Primary Examiner—Todd E. Manahan
Attorney, Agent, or Firm—Dowell & Dowell

[57] ABSTRACT

This invention provides a container and method of transport for transporting lobster and like live cargo. The container comprises a bin stackable on similar bins with a divider assembly mountable within the bin. The divider assembly has runner partition walls to extend the full extent of the bin in one direction; and cross partition walls to extend the full extent of the bin at right angles to the runner partition walls, to divide the bin into compartments of a size to receive individual lobsters. After the partition walls have been mounted into the bin to divide the bin into compartments of a size to receive a single lobster; a lobster is loaded into each compartment of the bin. The bin is then stacked onto a similar bin within a transport vehicle and transported to the place of use. The lobster is then unloaded from the bins at the place of use. The divider assembly is then removed from each of the bins, the bins nested and returned to the field for re-loading.

7 Claims, 5 Drawing Sheets

CONTAINER AND METHOD FOR TRANSPORTING LIVE CRUSTACEANS

FIELD OF THE INVENTION

This invention relates to a container and a method for transporting live crustaceans, such as lobster, to market.

BACKGROUND OF THE INVENTION

It has been the practice to transport live crustacean such as lobster to market by piling the creatures into a crate-type container and then transporting the container to market. Seaweed and ice are often also added to the container for moisture and temperature control.

This manner of transport has proven to be less than satisfactory. The lobsters in reaction to the closed quarters to which they are subjected experience stress and attack each other. Mutilation of cargo and high mortality results. Another recurring problem is that a large number of the lobsters often end up crushed because of the overpacking.

Using this conventional packing method described above, lobsters cannot be stored for more than a day without the mortality rate rising to an unacceptable level. The distance that the lobsters can be transported to market in bulk is thereby restricted.

There has long been a need to provide a economical system of transporting large numbers of live lobster longer distances and over longer times while avoiding unacceptably high mortality rates.

It has long been known that the mortality rate could be reduced if the stress experienced by the live lobsters could be reduced and if the lobsters could be prevented from attacking each other, but there has been no acceptable manner of achieving this until the present invention.

Overcoming the problems of the prior art reaps several benefits. One advantage is that more product will make it to market and another advantage is that new markets will become available because of the greater distances and time of transport.

It is an object of this invention to provide a container and method for transporting live crustaceans, such as lobster, that is economical and will permit the bulk transport of lobster over longer distances and times with reduced mortality rates.

It is also an object of this invention to provide a transport container which economically provides individual compartments of an adjustable size for each lobsters.

Other advantages will become apparent upon reading the disclosure in conjunction with the drawings.

SUMMARY OF THE INVENTION

According to one aspect of the present invention, there is provided a container for lobster and like live cargo comprising: a bin stackable on similar bins; a divider assembly mountable within the bin, the divider assembly having runner partition walls to extend the full extent of the bin in one direction of the bin; and cross partition walls to extend the full extent of the bin at right angles to the runner partition walls, to divide the bin into compartments of a size to receive an individual lobster.

According to another aspect of the present invention, there is provided a configuration of stacked shipping containers for lobster and similar live cargo comprising: a plurality of stackable bins in a stacked configuration; each of said bins having divider means including runner partition walls extending the full extent of the bin in one direction of the bin and cross partition walls extending the full extent of the bin at right angles to the runner partition walls to divide each of said bins into compartments of a size to receive an individual lobster;

According to another aspect of the present invention, there is provided a method of sustaining live lobster and similar live cargo during transport from the field to the place of use in a plurality of similar stackable nestable bins comprising the steps of: mounting partition walls into the bins to divide each of said bins into compartments of a size to receive one lobster; loading lobster into the compartments of the bins; stacking the loaded bins on a transport vehicle and transporting them to the place of use; unloading the lobster from the bins at the place of use; nesting the bins; returning the bins to the lobster field for reuse.

The invention will be clearly understood after reading the following specification in conjunction with the following drawings of the preferred embodiment in which:

DETAILED DESCRIPTION

Figure 1:
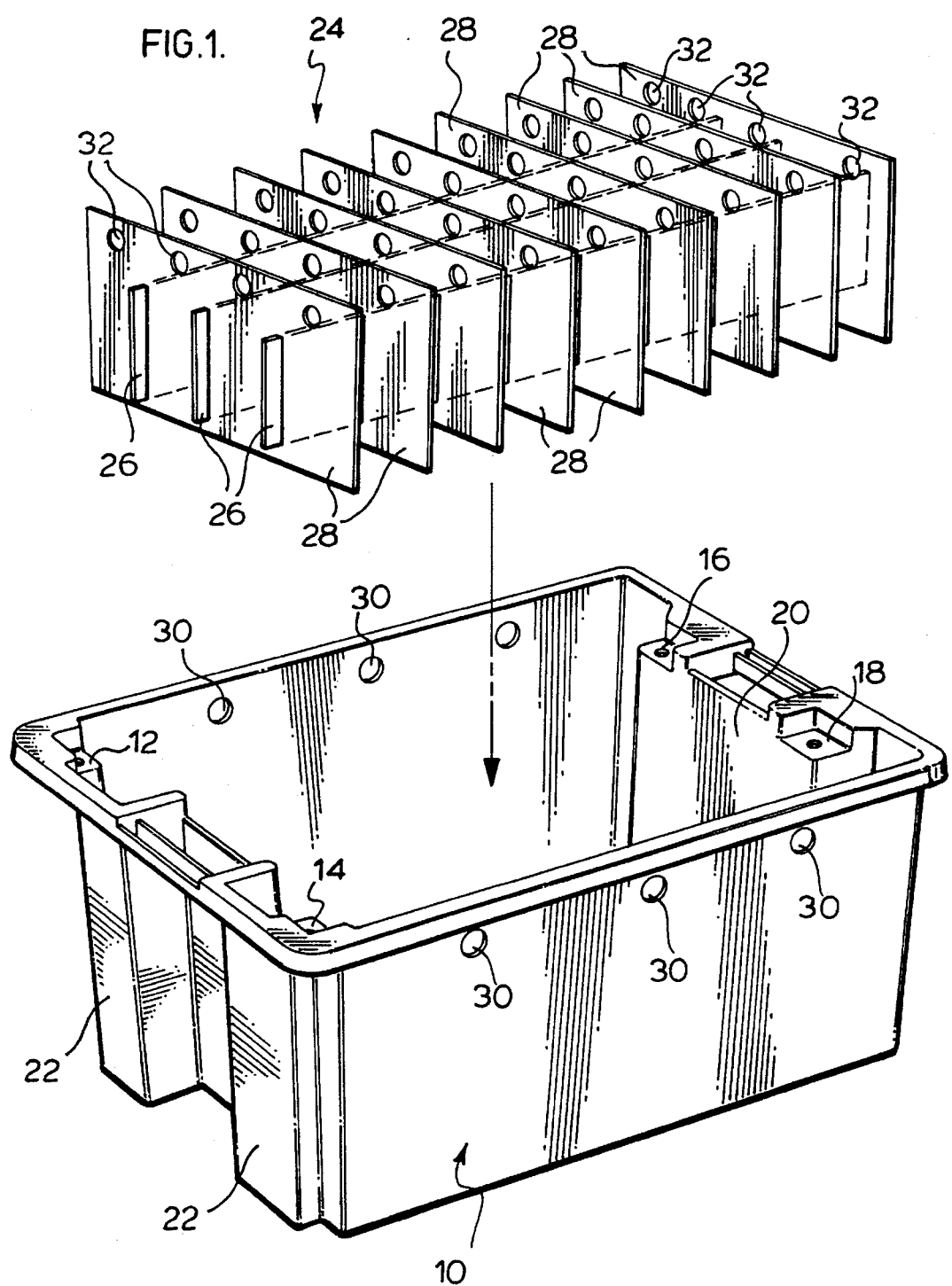
FIG. 1 is a perspective view showing the divider assembly about to be projected into the bin.
Figure 2:
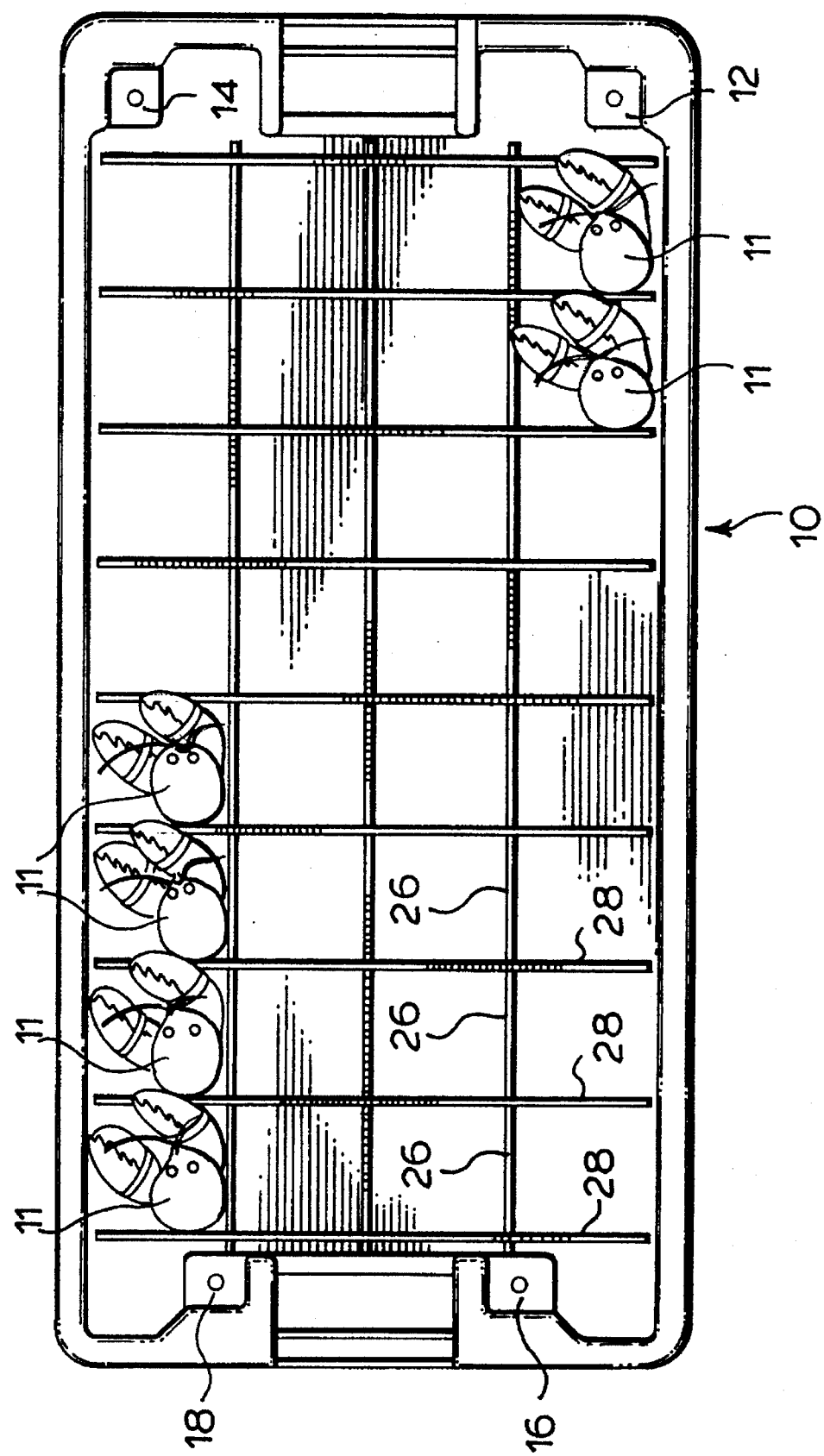
FIG. 2 is a top view of the container showing lobsters placed in some of the compartments.
Figure 3:
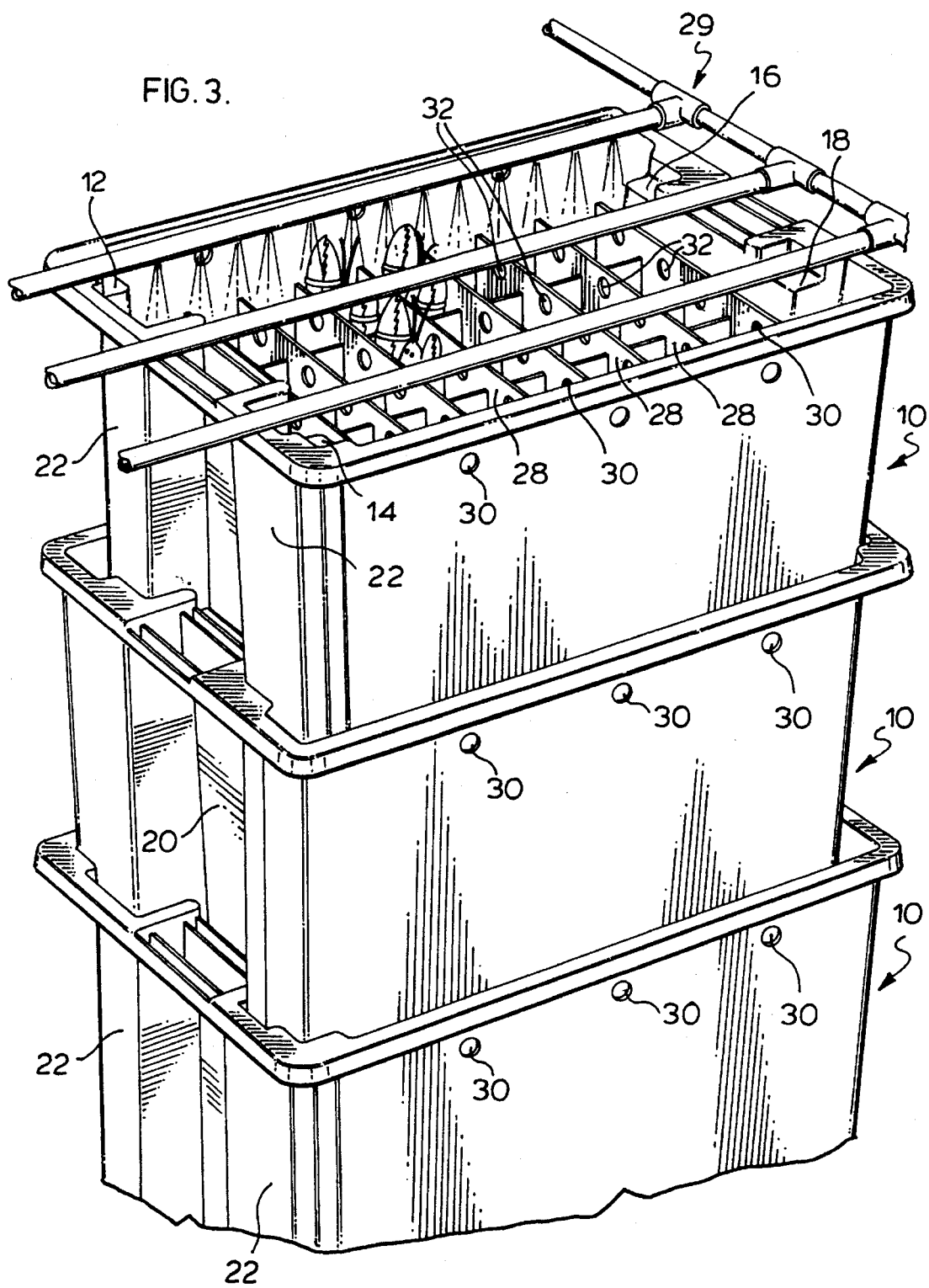
FIG. 3 is a partial perspective view showing several of the bins being stacked on each other and a water source mounted above the uppermost bin.
Figure 5:
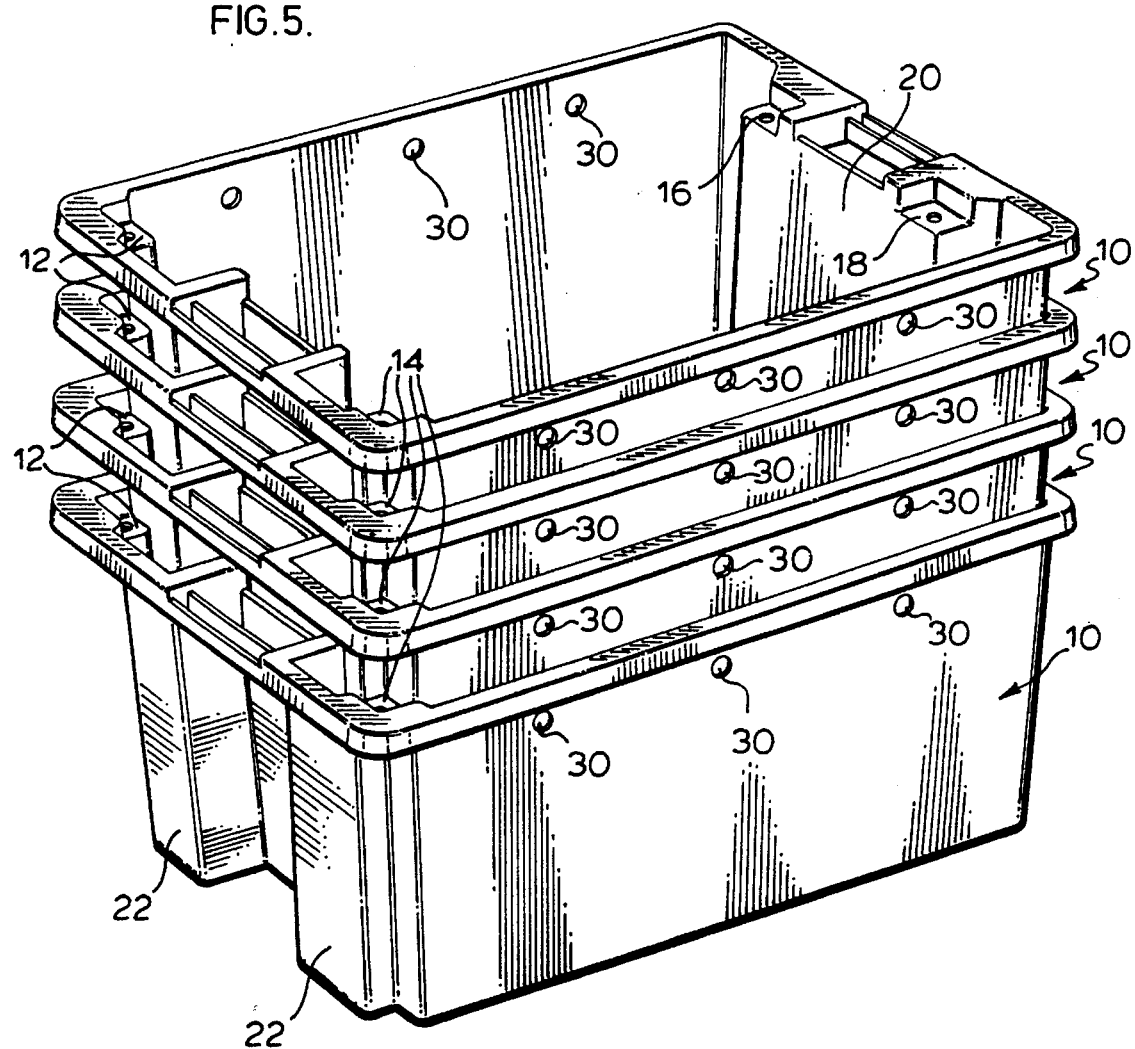
FIG. 5 is a perspective view showing the nesting arrangement of the bins.

Referring to the drawings, the bin 10 of a standard commercially available type that is both stackable, as shown in FIG. 3, and nestable, as shown in FIG. 5. Each bin is formed with seats 12, 14 at one end and seats 16, 18 at its other end. The walls of the bins all slope downwardly and inwardly. If an upper bin 10 is placed over a lower bin with the end of the upper bin having seats 12 and 14 overlying the end of the lower bin having seats 12 and 14, the bins will nest. However, if an upper bin 10 is place on top of a lower bin 10 with the end of the upper bin having seats 12 and 14 overlying the end of the lower bin having seats 16, 18, the bins will stack because the base of the posts 20 will seat on seats 16 and 18 while the base of the posts 22 will seat on seats 12 and 14.

Bins that are both stackable and nestable are known, although they have never been adapted for lobster transport before.

The divider means which divide the bin into compartments for the individual lobster is generally referred to by the numeral 24. It includes runner partition walls 26 which have a length to extend the full extent of the bin 10 in one direction and cross partition walls which have a length to extend the full extent of the bin 10 at right angles to the runner partition walls 26. In the preferred embodiment the runner partition walls extend through vertically extending slots formed in the cross partition walls 28 so that their longitudinal positioning in the bin can be adjusted to increase or decrease the size of the individual compartments and accommodate different sized lobsters.

Water circulation openings 32 are formed on the cross partition walls 28 to facilitate the circulation of water within in the bin during transport.

In the embodiment illustrated, the divider means 24 disassembles and reassembles easily on site. The cross partition walls 28 are slid through their openings onto the runner partition walls as needed. The larger the size of the particular lobsters being transported, the less the number of cross-partition walls 28 will be required for that particular cargo.

Alternatively, the divider means 24 can be provided preassembled by crimping the ends of the runner partition walls 26 or by using some other form of stopper at the ends of the partition walls 26 so that its component parts do not separate during non-use. During non-use, the divider means can be removed from the bin and flattened as a unit for ease of transport if the partition walls are of a flexible plastics material.

Figure 4:
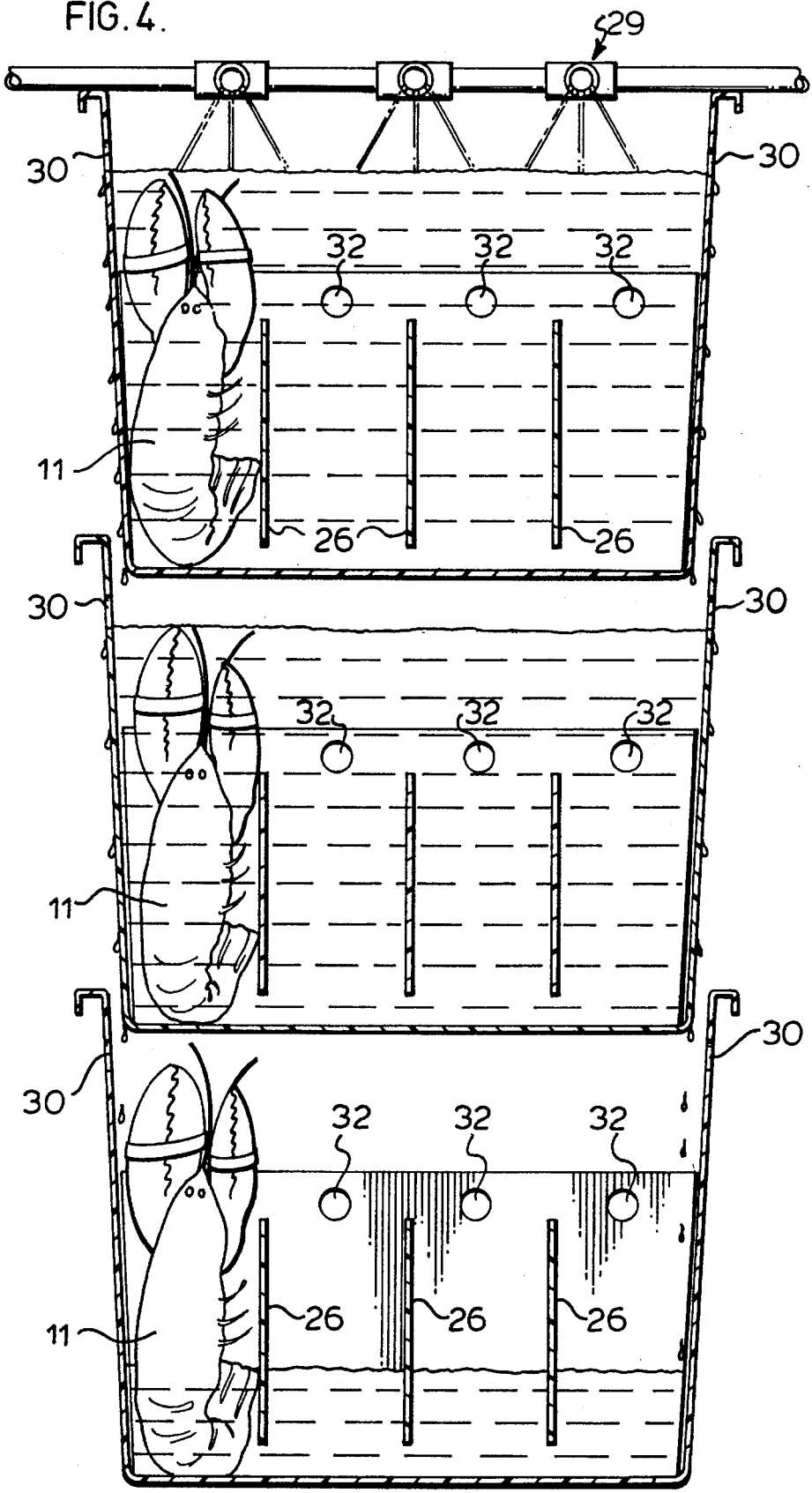
FIG. 4 is a cross-sectional view showing the drainage system.

For some distances of transport, it is advantageous to form drainage openings on the bins and provide a seawater source such as the water pipe system, generally referred to as 29 in the drawings. As shown in FIGS. 3 and 4, the seawater is sprayed from the supply pipes of the water pipe system 29 into the uppermost bin 10 of the stacked bins and fills the bin up to the level of the drainage holes 30 from which it drains downwardly into the bin below. In the bin arrangement illustrated in FIG. 4, the water in the lowermost bin has not reached drainage opening 30. When reached, water drains from the opening 30 of the lower bin to a sump, from which it is recirculated to the upper bin. Circulation and aeration of water in this general fashion is not broadly new and it is not illustrated in detail in this specification.

For shorter distances of travel, a water source will not be required provided that the lobsters are moist when they are placed into their individual compartments. The position of the drainage openings will also vary depending on distance and time of transport. Filling each bin to a level that totally immerses the lobster adds a substantial weight to the cargo. Thus, the drainage holes can be placed at a lower height on the bin's walls or, even in some circumstances, on the bottom of the bin to reduce the water level in the bins.

Materials that can be used for the construction of the divider assembly and the bins will be apparent to those skilled in the art. The materials used by the inventor and found to be effective are polyurethane plastics.

In use, the bins 10 are taken to the site for loading while in a nested relationship. The divider means 24 is either disassembled of flattened. The container is assembled by first assembling the divider assembly and mounting it within the bin 10. The claws of the lobster are preferably taped, and individual lobsters are loaded into compartments formed in the divider assembly. The size of the compartments is adjusted by sliding the cross partition walls along the runner partition walls to suit the size of the lobsters contained therein. The process is repeated for each bin and the bins are then stacked. If required and if the bins have drainage openings, a water source and circulating means is added to provide moisture to the cargo. The cargo is then transported to the place of use and unload from the bins. The divider assembly is removed and then disassembled or flattened. The bins are nested, reducing storage space. The bins and divider assemblies are then returned to the lobster field for reuse.

The number of bins that can be safely stacked on top of each other for purposes of transport will of course depend upon the conditions of transport, the height of the transport vehicle, the size of the bins and any other relevant circumstances. The inventor has, however, successfully stacked 10 inch high stackable-nestable plastic bins with length-width measuremens of 30 inches by 15 inches eight units high without difficulty. He has also found that bins of this size can easily accomondate 32 one-pound lobsters, or 28 one and one-quarter pound lobsters, or 24 one and one-half pound lobsters.

Different types of stackable/nestable bins will lend themselves to different methods of loading as well. Bins can usually always be loaded onto the transport vehicle by hand, but certain types of bins are palletized for loading by machine. The stackable/nestable bins, in themselves, are standard refrigeratable containers usually made from a plastics material having the necessary properties of strength and weatheability.

The container and transport method of this invention permits the transporting of live crustaceans, such as lobster, longer distances and over time than has heretofore been possible. Because each lobster is separated from the other lobsters, stress of transport to the cargo is reduced, fighting is prevented and mortality reduced. Under proper conditions, the cargo can live for periods of two months. Furthermore, the system is economical because the component parts are reusable and inexpensive.

Other advantages and modifications, without deviating from the scope of this invention, will be apparent to those skilled in the art and it is not intended that this specification be read in a limiting sense, but that the scope of protection extent to the invention as a whole as claimed in the appended claims.

I claim:

1. A container for lobster and other live aquatic crustacean cargo comprising:

a bin stackable on similar bins; and a divider assembly mountable within the bin, the divider assembly having runner partition walls to extend the full extent of the bin in one direction of the bin; and cross partition walls to extend the full extent of the bin at right angles to the runner partition walls, to divide the bin into compartments of a size to receive an individual live aquatic crustacean;

said cross partition walls being slidably positionable longitudinally of the runner partition walls within the bin to vary the size of the compartments in use.

2. A container as claimed in claim 1 wherein the said bin has a bottom and walls that slope outwardly from said bottom whereby said bin is nestable with similar bins.

3. A container as claimed in claim 1 or claim 2 wherein drainage openings are formed in the bin to permit water to drain from the bin during use.

4. A configuration of stacked shipping containers for live lobster and other live aquatic crustacean cargo comprising:

a plurality of stackable bins in a stacked configuration;

each of said bins having divider means including runner partition walls extending the full extent of the bin in one direction of the bin and cross partition walls extending the full extent of the bin at right angles to the runner partition walls to divide each of said bins into compartments of a size to receive an individual live aquatic crustacean;

said cross partition walls having openings through which the runner partition walls are extendable whereby the cross partition walls are slidably adjustable longitudinally of the runner partition walls to vary the size of the compartments.

5. A configuration of stacked shipping containers as claimed in claim 4 wherein each underlying bin is adapted to receive water from its overlying bin whereby live cargo in the bins can be supplied with water to sustain life during shipment; and wherein there is provided a water source above said stacked configuration of bins to provide water into said bins, the bins being formed with drainage openings to permit water to drain downwardly of said stacked configuration of bins during use.

6. A method of sustaining live lobster and other live aquatic crustacean cargo during transport from a shipping point to the place of use in a plurality of similar stackable nestable bins comprising the steps of:

mounting runner partition walls into the bins;

mounting cross partition walls into the bins for sliding movement longitudinally of the runner partition walls;

moving the cross partition walls longitudinally of the runner partition walls to contain a live aquatic crustacean between adjacent cross partition walls and to divide each of said bins into compartments of a size to receive one live aquatic crustacean;

loading aquatic crustacean into the compartments of the bins;

stacking the loaded bins on a transport vehicle and transporting them to the place of use;

unloading the aquatic crustacean cargo from the bins at the place of use;

removing the partition walls, as assembled in compartments, from the bin;

nesting the bins;

returning the bins to shipping point for reuse.

7. A method of sustaining live lobster and other live aquatic crustacean cargo during transport from the shipping point to the place of use in a plurality of similar stackable nestable bins as claimed in claim 6 including the step of:

maintaining a flow of sea water through the bins to fulfil the aquatic crustacean cargo's requirements during transport.

\* \* \* \* \*